(12) United States Patent
Teig et al.

(10) Patent No.: US 11,475,310 B1
(45) Date of Patent: Oct. 18, 2022

(54) TRAINING NETWORK TO MINIMIZE WORST-CASE ERROR

(71) Applicant: Perceive Corporation, San Jose, CA (US)

(72) Inventors: Steven L. Teig, Menlo Park, CA (US); Andrew C. Mihal, San Jose, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 1184 days.

(21) Appl. No.: 15/825,030

(22) Filed: Nov. 28, 2017

Related U.S. Application Data (60) Provisional application No. 62/427,739, filed on Nov. 29, 2016.

(51) Int. Cl.
*G06N 3/08* (2006.01)
*G06N 7/00* (2006.01)

(52) U.S. Cl.
CPC ............. *G06N 3/084* (2013.01); *G06N 7/005* (2013.01)

(58) Field of Classification Search
CPC ........... G06N 3/084; G06N 7/005; G06N 7/00
See application file for complete search history.

(56) References Cited

U.S. PATENT DOCUMENTS

| | | | | |
|---|---|---|---|---|
| 4,866,634 A | * | 9/1989 | Reboh | G06N 5/04 706/60 |
| 5,255,347 A | * | 10/1993 | Matsuba | G06N 3/0454 706/25 |
| 5,579,436 A | * | 11/1996 | Chou | G10L 15/063 704/236 |
| 6,985,781 B2 | * | 1/2006 | Keeler | G05B 13/027 700/29 |
| 7,333,923 B1 | | 2/2008 | Yamanishi et al. | |
| 8,000,538 B2 | * | 8/2011 | Sarkar | G06K 9/00442 382/228 |
| 8,145,662 B2 | * | 3/2012 | Chen | G06F 16/36 707/767 |
| 9,373,087 B2 | * | 6/2016 | Nowozin | G06N 20/00 |
| 10,019,654 B1 | * | 7/2018 | Pisoni | G06N 3/084 |
| 10,586,151 B1 | * | 3/2020 | Teig | G06N 3/0481 |

(Continued)

OTHER PUBLICATIONS

Chen et al., "Markov Approximation for Combinatorial Network Optimization", Jun. 14, 2013, IEEE Trans. Inf. Theory 59(10): 6301-6327 (Year: 2013).*

(Continued)

*Primary Examiner* — Hal Schnee
(74) *Attorney, Agent, or Firm* — Adeli LLP (57) ABSTRACT

Some embodiments provide a method for configuring a machine-trained (MT) network that includes multiple configurable weights to train. The method propagates a set of inputs through the MT network to generate a set of output probability distributions. Each input has a corresponding expected output probability distribution. The method calculates a value of a continuously-differentiable loss function that includes a term approximating an extremum function of the difference between the expected output probability distributions and generated set of output probability distributions. The method trains the weights by back-propagating the calculated value of the continuously-differentiable loss function.

22 Claims, 7 Drawing Sheets

(56) References Cited

U.S. PATENT DOCUMENTS

| | | |
|---|---|---|
| 2003/0033263 A1* | 2/2003 | Cleary .................. G06N 20/00 706/12 |
| 2004/0243954 A1* | 12/2004 | Devgan .............. G06F 30/3312 716/113 |
| 2006/0010093 A1* | 1/2006 | Fan ......................... G06F 16/40 |
| 2007/0078630 A1* | 4/2007 | Filatov ................... G06F 30/17 702/189 |
| 2007/0239642 A1* | 10/2007 | Sindhwani .......... G06K 9/6269 706/25 |
| 2007/0271287 A1* | 11/2007 | Acharya .............. G06K 9/6219 |
| 2008/0256011 A1* | 10/2008 | Rice ....................... G06N 7/005 706/46 |
| 2009/0106173 A1* | 4/2009 | Andrew ................ G06N 20/00 706/12 |
| 2010/0082639 A1* | 4/2010 | Li .......................... G06F 16/334 707/748 |
| 2011/0105346 A1* | 5/2011 | Beattie ................. C12Q 1/6888 506/9 |
| 2011/0120718 A1* | 5/2011 | Craig ..................... E21B 43/16 166/308.1 |
| 2011/0182345 A1* | 7/2011 | Lei ........................ H04L 1/0071 375/227 |
| 2012/0271791 A1* | 10/2012 | van der Laan ........ G06N 20/00 706/52 |
| 2012/0283992 A1* | 11/2012 | Ji .......................... H04L 67/34 702/188 |
| 2012/0331025 A1* | 12/2012 | Gemulla ................ G06F 17/11 708/200 |
| 2013/0257873 A1* | 10/2013 | Isozaki ................ G06T 11/206 345/440 |
| 2014/0124265 A1* | 5/2014 | Al-Yami ................ G06N 7/005 175/24 |
| 2014/0207837 A1* | 7/2014 | Taniguchi ............. G06F 17/10 708/207 |
| 2014/0222747 A1* | 8/2014 | Zhou ...................... G06N 5/025 706/52 |
| 2015/0100530 A1* | 4/2015 | Mnih ..................... G06N 20/00 706/25 |
| 2015/0161995 A1* | 6/2015 | Sainath .................. G06N 5/025 706/52 |
| 2015/0262083 A1* | 9/2015 | Xu ......................... G06N 20/00 706/12 |
| 2016/0132786 A1* | 5/2016 | Balan .................... G06N 20/00 706/12 |
| 2016/0260222 A1* | 9/2016 | Paglieroni .......... G06K 9/00201 |
| 2017/0061326 A1* | 3/2017 | Talathi .................. G06N 3/082 |
| 2017/0068844 A1* | 3/2017 | Friedland ............. G06K 9/4604 |
| 2017/0091615 A1* | 3/2017 | Liu ........................ G06N 3/0445 |
| 2017/0140298 A1* | 5/2017 | Wabnig ................. G06N 20/00 |
| 2017/0154425 A1* | 6/2017 | Pierce ..................... G06T 7/73 |
| 2017/0161640 A1 | 6/2017 | Shamir |
| 2017/0183836 A1* | 6/2017 | Ahmed ..................... E02D 3/12 |
| 2017/0262735 A1* | 9/2017 | Ros Sanchez .......... G06K 9/481 |
| 2018/0033024 A1* | 2/2018 | Latapie ............. G06K 9/00778 |
| 2018/0101783 A1* | 4/2018 | Savkli .................. G06K 9/6224 |
| 2018/0174041 A1* | 6/2018 | Imam ..................... G06N 3/063 |
| 2018/0219888 A1* | 8/2018 | Apostolopoulos .......................... H04L 63/1425 |
| 2019/0005358 A1 | 1/2019 | Pisoni |
| 2019/0230913 A1* | 8/2019 | Chen ...................... A01K 99/00 |
| 2019/0286970 A1* | 9/2019 | Karaletsos ........... G06N 3/0454 |
| 2020/0007934 A1* | 1/2020 | Ortiz ..................... G06N 3/0454 |
| 2020/0249996 A1* | 8/2020 | Kumar Addepalli ........................ G06F 9/30101 |

OTHER PUBLICATIONS

Srivastava et al., "Dropout: A Simple Way To Prevent Neural Networks from Overfitting", Jan. 2014, Journal of Machine Learning Research 15 (1): 1929-1958 (Year: 2014).*

Eisele, "The log-sum-exp trick in Machine Learning", Jun. 2016, https://www.xarg.org/2016/06/the-log-sum-exp-trick-in-machine-learning/ (Year: 2016).*

Shalev-Shwartz, "Minimizing the Maximal Loss: How and Why?", May 2016, ICML 2016, arXiv:1602.01690v2 (Year: 2016).*

Li, Hong-Xing, et al., "Interpolation Functions of Feedforward Neural Networks," Computers & Mathematics with Applications, Dec. 2003, 14 pages, vol. 46, Issue 12, Elsevier Ltd.

Duda, Jarek, "Asymmetric Numeral Systems: Entropy Coding Combining Speed of Huffman Coding with Compression Rate of Arithmetic Coding," Jan. 6, 2014, 24 pages, arXiv:1311.2540v2, Computer Research Repository (CoRR)—Cornell University, Ithaca, NY, USA.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Huang, Gao, et al.,"Multi-Scale Dense Networks for Resource Efficient Image Classification," Proceedings of the 6th International Conference on Learning Representations (ICLR 2018), Apr. 30-May 3, 2018, 14 pages, ICLR, Vancouver, Canada.

Jain, Anil K., et al., "Artificial Neural Networks: A Tutorial," Computer, Mar. 1996, 14 pages, vol. 29, Issue 3, IEEE.

Sze, Vivienne, et al., "Efficient Processing of Deep Neural Networks: A Tutorial and Survey," Aug. 13, 2017, 32 pages, arXiv:1703. 09039v2, Computer Research Repository (CoRR)—Cornell University, Ithaca, NY, USA.

Mandelbaum, Amit et al., "Distance-based Confidence Score for Neural Network Classifiers," Sep. 28, 2017, 10 pages, arXiv:1709. 09844v1, Computer Research Repository (CoRR) ,Cornell University, Ithaca, NY, USA.

* cited by examiner

TRAINING NETWORK TO MINIMIZE WORST-CASE ERROR

BACKGROUND

Many machine learning applications involve the optimization of information-theoretic terms such as entropy, cross-entropy, Kullback-Leibler divergence, mutual information, and the like. Many of these depend in some form on Shannon entropy, or one of its generalizations, such as Renyi entropy or Tsallis entropy. Equation (A) provides one discrete formulation of Shannon's entropy function H. As shown, this function computes the negative of the sum of the multiplication of the probability p(u) of discrete random variable u with the log (base 2) of this probability over all the discrete variables in a set U of values:

$$H(p) = -\Sigma_{u \in U} p(u) \log p(u). \quad (A)$$

The use of entropy within the loss function of a machine learning system leads to the optimization of average error. This approach causes outliers in the training data sets to be swamped by a preponderance of non-outliers in the expected value computation of entropy. Often, outliers are "stranded" in the wrong place because the magnitudes and/or gradients of the errors are too small to avoid having the optimization algorithm terminate prematurely. Given that often data sets used for machine learning have far more "typical" examples than "unusual" ones, the pervasive use of entropy to measure model quality risks overfitting the typical examples at the expense of potentially informative outliers, leading to models that do not generalize well.

In place of entropy, some machine-learning applications use a cross entropy function, such as $$H(p,q) = -\Sigma_{u \in U} p(u) \log q(u), \quad (B)$$

where p and q are two probability distributions, with q being an "unnatural" probability distribution of discrete random variable u in the set of discrete variables U while p is the "true" distribution of this variable. In this equation, the cross entropy between two probability distributions p and q over the same underlying set of events U measures the average number of bits needed to identify an event drawn from the set. Since for many applications the true distribution p is unknown, cross entropy is calculated by using other formulas, such as $$H(T, q) = -\sum_{i=1}^{N} \frac{1}{N} \log q(u_i), \quad (C)$$

where N is the size of the test set, and q(u) is the probability of the event u estimated from the training set. Other machine learning applications use other cost functions that have some form of entropy expression. For instance, other applications use conditional entropy expressions, mutual information expressions, etc. However, all of these cost functions often express some form of average error, the optimization of which disregards the information contained in outlier values in the training set.

BRIEF SUMMARY

Some embodiments of the invention train a multi-layer node network so as to minimize the worst-case error rather than the average error. For instance, in the case of a classifier network (that classifies an input into one of a discrete set of categories), some embodiments identify the input category with the maximum difference between the expected output probability distribution and the actual output probability distribution and train the network parameters so as to minimize this maximum difference.

The multi-layer network of some embodiments includes a layer of one or more input nodes, a layer of one or more output nodes, and one or more layers of hidden (interior) nodes. Each node in the multi-layer network produces an output value based on one or more input values. Specifically, each hidden node and output node, in some embodiments, bases the output value on the output values of a set of other nodes (e.g., the set of nodes of the previous layer). In some embodiments, each node includes (i) a linear component that uses a set of weight values to linearly combine the input values of the node to produce an intermediate result and (ii) a non-linear component that applies a non-linear function to the intermediate result to calculate the output value for the node.

During training of the network, the weight values are adjusted to arrive at a trained network that produces optimal outputs for any input value. The multi-layer network may be designed to perform a specific function when embedded in a device (e.g., a mobile device such as a smart phone, tablet, etc., an Internet of Things (IOT) device such as a smart refrigerator, baby monitor, etc., or other devices). Such functions can include face recognition, voice recognition, identification of types of objects in images, large-scale data analysis, etc.).

To train the multi-layer network, some embodiments first propagate a set of inputs through the network, with each input generating a set of outputs. Some embodiments perform training with a large number of different inputs. Each input (e.g., an image, a voice snippet, etc., or a representation of such an input) propagates through the network, with each layer of nodes receiving their one or more inputs and generating an output to pass to the next layer of nodes. In the final output layer, one or more nodes receives the outputs from the previous layer and generates the outputs. A typical loss function measures the difference between the output for a particular input and a predefined expected, or optimal, output for that input.

In typical training, the gradient of the loss function is back propagated through the network in a process that determines, for each weight, the rate of change of the loss function with respect to a change of the weight at the current value of the loss function. The backpropagation process uses the chain rule for partial derivatives to isolate the partial derivative of the loss function with respect to each individual weight used in the multi-layer network, and assign a value to this partial derivative for the current value of the loss function. Thus, this process identifies the relative effect on the loss function of changes to the many different weights used to generate the outputs of the network. These gradients are used to update the weight values by moving the weight values in the direction opposite the gradient (to attempt to reduce the loss function value) by a particular amount, with a larger gradient for a particular weight resulting in a greater change to that weight.

Some embodiments train the network using a continuously-differentiable loss function that includes a term approximating an extremum function of the difference between expected output probability distributions and actual output probability distributions. Because actual extremum functions (e.g., the min and max functions) are not continuously-differentiable (a requirement for backpropagation), some embodiments use a log-sum-exponent function to approximate an extremum function. The log-sum-exponent (LSE) function uses an entropy calculation as its argument (e.g., as the exponent of the exponential function), so that for a set of probability distributions the LSE function approximates the maximum of the entropy calculations for each of the probability distributions.

As mentioned, in some embodiments the machine-trained network acts as a classifier, taking an input and classifying that input into one of a discrete set of categories. An example of such a network is an object recognition network that takes an image as its input and classifies the image based on an object in the image (e.g., cat, dog, person, car, truck, etc.). The set of inputs used to train such a network includes numerous (e.g., thousands) of inputs for each category, and the expected output probability distribution for the set of inputs of any given category is 100% for the particular category and 0% for each of the other categories (e.g., optimally the network should perfectly identify that a cat is a cat with no possibility that the cat is anything else). However, the typical output average probability distribution for a set of inputs of one category will be non-zero (though ideally close to 1 for the input category and close to 0 for the other categories). Some embodiments identify the category of inputs that has the output probability distribution with the highest entropy (i.e., is furthest from an optimal output probability distribution) and trains the network to correct its treatment of these inputs.

For the specific example of a classifier, the LSE function used as the loss function or as a term in the loss function is the natural logarithm of the summation of exponential functions. The index of the summation is the set of input categories, and the exponent of the exponential function ($e^x$) for each category is the entropy of the output probability distribution for the category (thus, as per Equation A above, the exponent is itself a summation).

This loss function thus approximates the maximum of the entropies of the output probability distribution for the different input categories. As a result, the backpropagation process will bias the training of the weights towards correcting the categorization of whichever input has the "worst" results, rather than ignoring outlier inputs in favor of improving the overall average.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention train a multi-layer node network so as to minimize the worst-case error rather than the average error. For instance, in the case of a classifier network (that classifies an input into one of a discrete set of categories), some embodiments identify the input category with the maximum difference between the expected output probability distribution and the actual output probability distribution and train the network parameters so as to minimize this maximum difference.

The multi-layer network of some embodiments includes a layer of one or more input nodes, a layer of one or more output nodes, and one or more layers of hidden (interior) nodes. Each node in the multi-layer network produces an output value based on one or more input values. Specifically, each hidden node and output node, in some embodiments, bases the output value on the output values of a set of other nodes (e.g., the set of nodes of the previous layer). In some embodiments, each node includes (i) a linear component that uses a set of weight values to linearly combine the input values of the node to produce an intermediate result and (ii) a non-linear component that applies a non-linear function to the intermediate result to calculate the output value for the node.

During training of the network, the weight values are adjusted to arrive at a trained network that produces optimal outputs for any input value. The multi-layer network may be designed to perform a specific function when embedded in a device (e.g., a mobile device such as a smart phone, tablet, etc., an Internet of Things (IOT) device such as a smart refrigerator, baby monitor, etc., or other devices). Such functions can include face recognition, voice recognition, identification of types of objects in images, large-scale data analysis, etc.).

Figure 1:
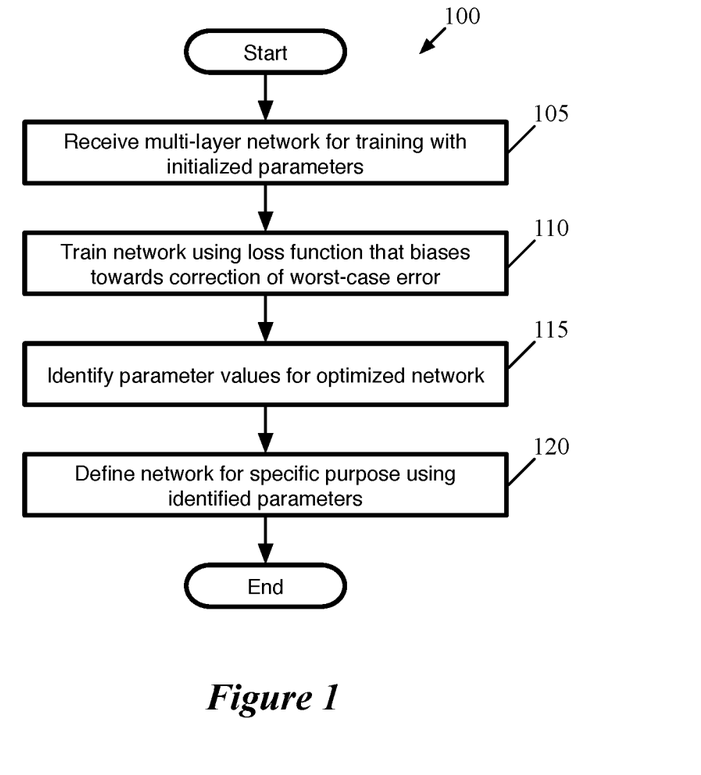
FIG. 1 conceptually illustrates a process of some embodiments for training a multi-layer network to execute a specific purpose, with the weight values used by the network trained to minimize the worst-case error.

FIG. 1 conceptually illustrates a process 100 of some embodiments for training a multi-layer network to execute a specific purpose, with the weight values used by the network trained to minimize the worst-case error (e.g., rather than optimizing for average error). The process, in some embodiments, is performed by a network optimization application, which may be a program executing on a single device (e.g., a single laptop or desktop, a mobile device, etc.) or a distributed application that operates on multiple machines (e.g., on multiple virtual machines within a datacenter so as to improve its processing capabilities).

Figure 2:
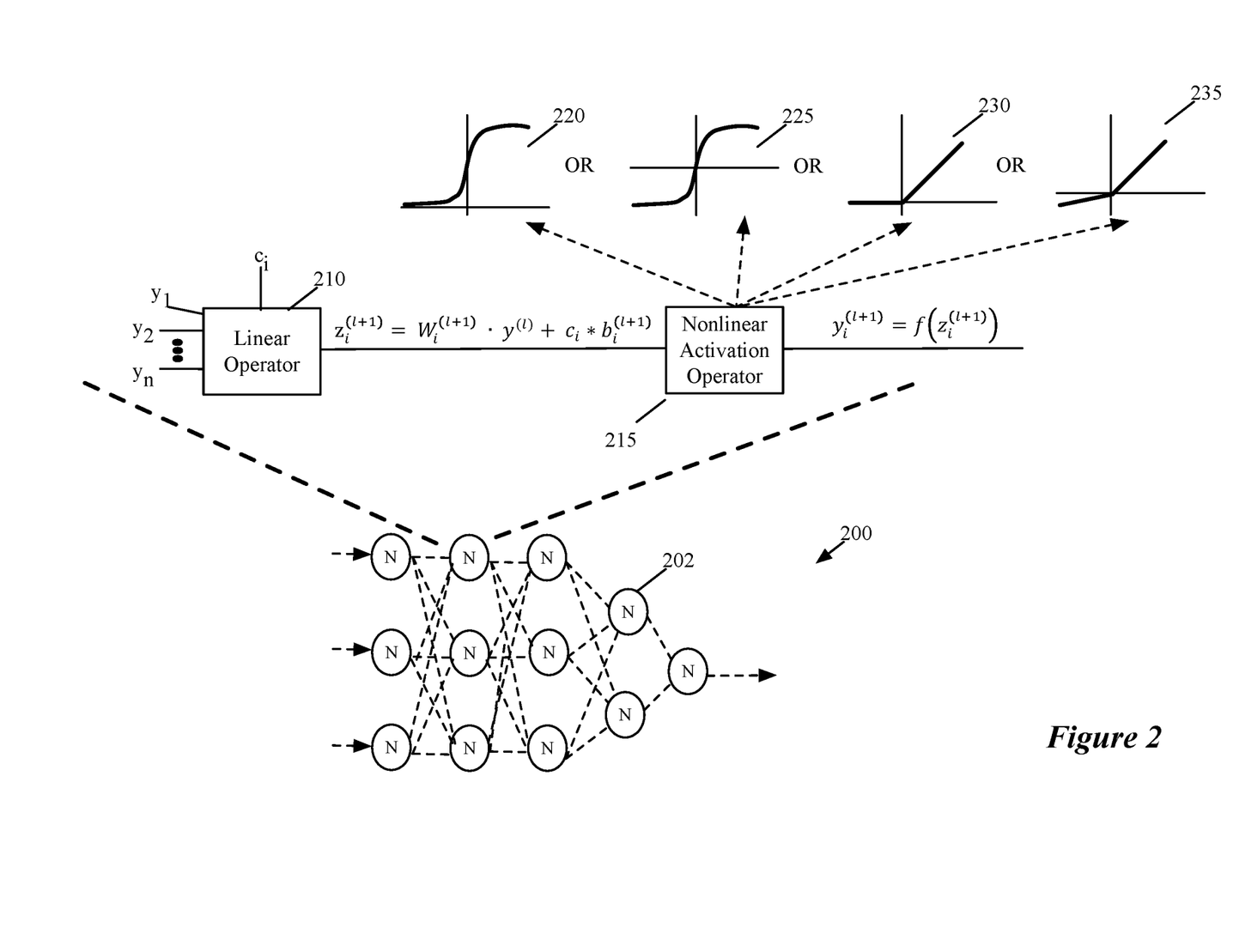
FIG. 2 illustrates an example of a multi-layer machine-trained network of some embodiments.

As shown, the process 100 receives a multi-layer network for training with initialized parameters (e.g., the weight values for each node, etc.). As mentioned, the multi-layer network of some embodiments is made up of numerous nodes that produce output values based on one or more input values. Each of the hidden and output nodes includes a linear component that uses a set of weight values to linearly combine the input values of the node, as well as a non-linear component that uses the output of the node's linear component to compute the output value for the node. FIG. 2, described below, illustrates an example of such a multi-layer network and the operation of one of its nodes.

The process then trains (at 110) the network using a loss function that biases towards correction of worst-case error. Specifically, some embodiments use as the loss function (or add to the loss function) a continuously-differentiable term that approximates an extremum function of the difference between expected output probability distributions and actual output probability distributions. Because actual extremum functions (e.g., the min and max functions) are not continuously-differentiable (a requirement for certain training techniques), some embodiments use a log-sum-exponent function to approximate an extremum function. The log-sum-exponent (LSE) function uses an entropy calculation as its argument (e.g., as the exponent of the exponential function), so that for a set of probability distributions the LSE function approximates the maximum of the entropy calculations for each of the probability distributions. The training process is described in further detail below by reference to FIG. 4.

Next, the process 100 identifies (at 115) the parameter values for the optimized network, as the result of the training process. The process then defines (at 120) a network for a specific purpose using the identified discrete weights. These purposes may include face recognition or other image analysis, voice recognition or other audio analysis, large-scale data analysis (e.g., for climate data), etc. The multi-layer network may be designed to operate on a smart phone, IOT device, etc.

FIG. 2 illustrates an example of a multi-layer machine-trained network of some embodiments. This figure illustrates a feed-forward neural network 200 that has multiple layers of processing nodes 202 (also called neurons). In all but the first (input) and last (output) layer, each node 202 receives two or more outputs of nodes from earlier processing node layers and provides its output to one or more nodes in subsequent layers. The output of the node (or nodes) in the last layer represents the output of the network 200. In some embodiments, the output of the network 200 is a number in a range of values (e.g., 0 to 1). In other embodiments, the output of the network 200 is a number representing one of a predefined set of categories (e.g., for a network that classifies each input into one of eight possible outputs, the output could be a three-bit value). In this example, the neural network 200 only has one output node. Other neural networks of other embodiments have several output nodes that provide more than one output value. In addition, the neural networks of other embodiments may be types of networks other than feed forward networks (e.g., recurrent networks, etc.).

As shown in FIG. 2, each node in neural network 200 has a linear component 210 and a nonlinear component 215. The linear component 210 of each hidden or output node in this example computes a dot product of a vector of weight coefficients and a vector of output values of prior nodes, plus an offset. In other words, a hidden or output node's linear operator computes a weighted sum of its inputs (which are outputs of the previous stage node that the linear operator receives) plus an offset. Similarly, the linear component 210 of each input node of some embodiments computes a dot product of a vector of weight coefficients and a vector of input values, plus an offset. In other embodiments, each input node receives a single input and passes that input as its output. Each node's nonlinear component 215 computes a function based on the output of the node's linear component 210. This function is commonly referred to as the activation function.

The notation of FIG. 2 can be described as follows. Consider a neural network with L hidden layers (i.e., L layers that are not the input layer or the output layer). The variable l can be any of the hidden layers (i.e., l∈{1, . . . , L-1} index the hidden layers of the network, with l=0 representing the input layer and l=L representing the output layer). The variable $z_i^{(l+1)}$ represents the output of the linear component of a hidden node i in layer l+1. As indicated by the following Equation (A), the variable $z_i^{(l+1)}$ is computed as the dot product of a vector of weight values $W_i^{(l+1)}$ and a vector of outputs $y^{(l)}$ from layer l plus an offset that is computed as a constant value $c_i$ times a weight value $b_i$, typically referred to as a bias.

$$z_i^{(l+1)} = W_i^{(l+1)} \cdot y^{(l)} + c_i * b_i^{(l+1)} = \sum_{k=1}^{n} \left( w_{ik}^{(l+1)} * y_k^{(l)} \right) + c_i * b_i^{(l+1)} \tag{D}$$

The constant value $c_i$ is a value to which all the weight values are normalized. In some embodiments, the constant value $c_i$ is 1. The symbol * is an element-wise product, while the symbol • is the dot product. The weight coefficients $W^{(l)}$ are parameters that can be adjusted during the network's training in order to configure this network to solve a particular problem.

The output $y^{(l+1)}$ of the nonlinear component 215 of a node in layer l+1 is a function of the node's linear component, and can be expressed as by Equation (E) below.

$$y_i^{(l+1)} = f(z_i^{(l+1)}) \tag{E}$$

In this equation, f is the nonlinear activation function for node i. Examples of such activation functions include a sigmoid function 220 ($f(x)=1/(1+e^{-x})$), a tanh function 225, a ReLU (rectified linear unit) function 230 or a leaky ReLU function 235, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions and periodic functions.

Equation (E) can be expressed in the following expanded format of Equation (F).

$$y_i^{(l+1)} = f(z_i^{(l+1)}) = f\left[\left(\sum_{k=1}^{n} w_{ik} * y_k\right) + c_i * b_i^{(l+1)}\right] \tag{F}$$

In this equation, $w_{ik}$ are weight values associated with the inputs $y_k$ of the node i in layer l+1.

Before a multi-layer network can be used to solve a particular problem, the network has to be put through a supervised training process that adjusts the network's configurable parameters (e.g., the weight coefficients of its linear components). The training process iteratively selects different input value sets with known output value sets. For each selected input value set, the training process typically (1) forward propagates the input value set through the network's nodes to produce a computed output value set, and then (2) backpropagates a gradient (rate of change) of a loss function (output error) that quantifies in a particular way the difference between the input set's known output value set and the input set's computed output value set, in order to adjust the network's configurable parameters (e.g., the weight coefficients). As mentioned, some embodiments use a loss function that emphasizes the worst-case error, as opposed to common loss functions that compute an average error.

Figure 3:
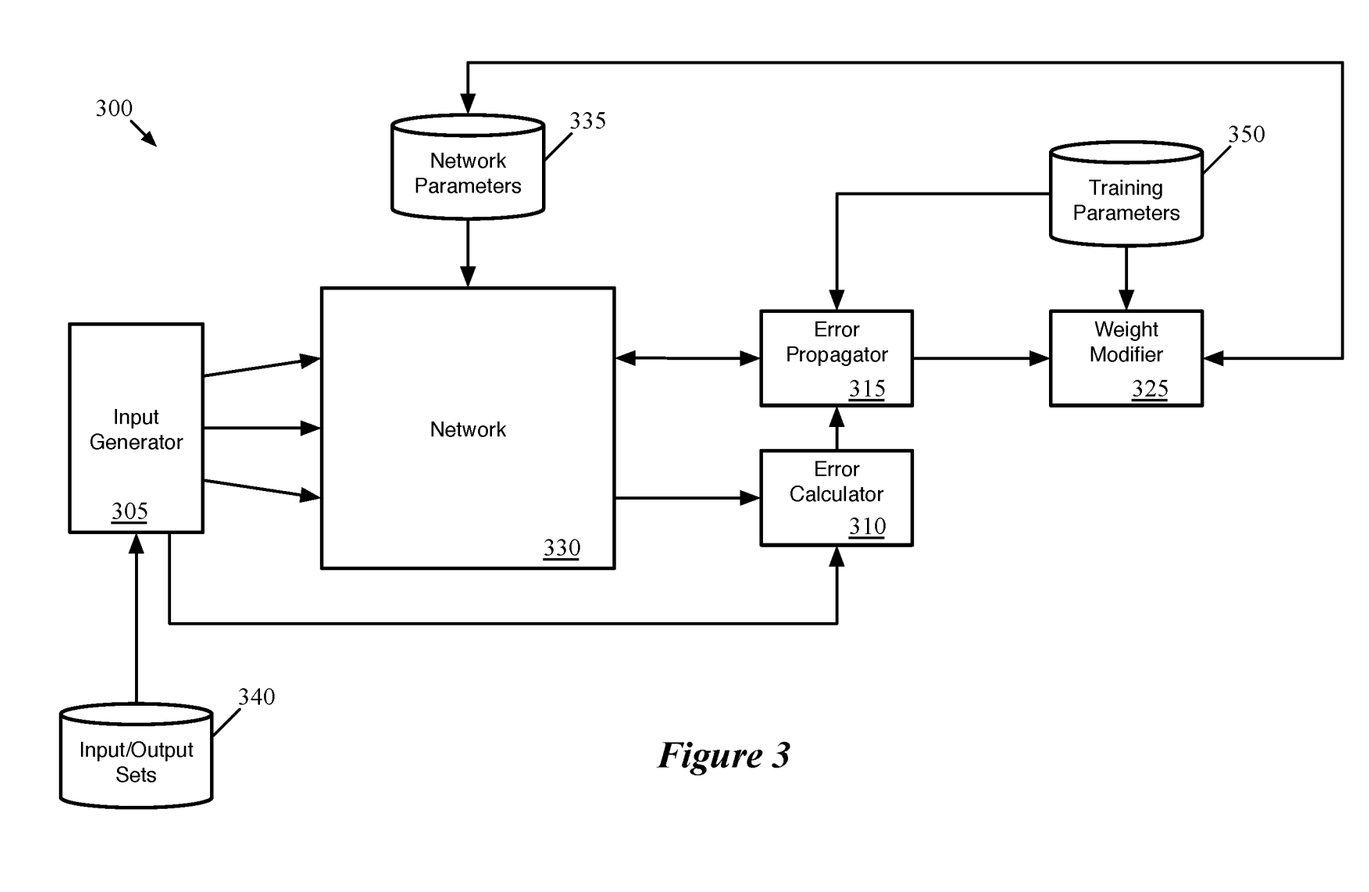
FIG. 3 conceptually illustrates a training system of some embodiments that uses an approximate extremum function in the loss function to minimize worst-case error.

FIG. 3 conceptually illustrates a training system 300 of some embodiments that uses an approximate extremum function in the loss function to minimize worst-case error. As shown, the system 300 includes an input generator 305, an error calculator 310, an error propagator 315, and a weight modifier 325. In some embodiments, all of these modules execute on a single device, such as a server, a desktop or laptop computer, a mobile device (e.g., a smartphone, tablet, etc.), a virtual machine, etc. In other embodiments, these modules may execute across multiple interconnected devices (or virtual machines), or separate instances may execute on multiple devices (or virtual machines) for additional computing power).

Figure 4:
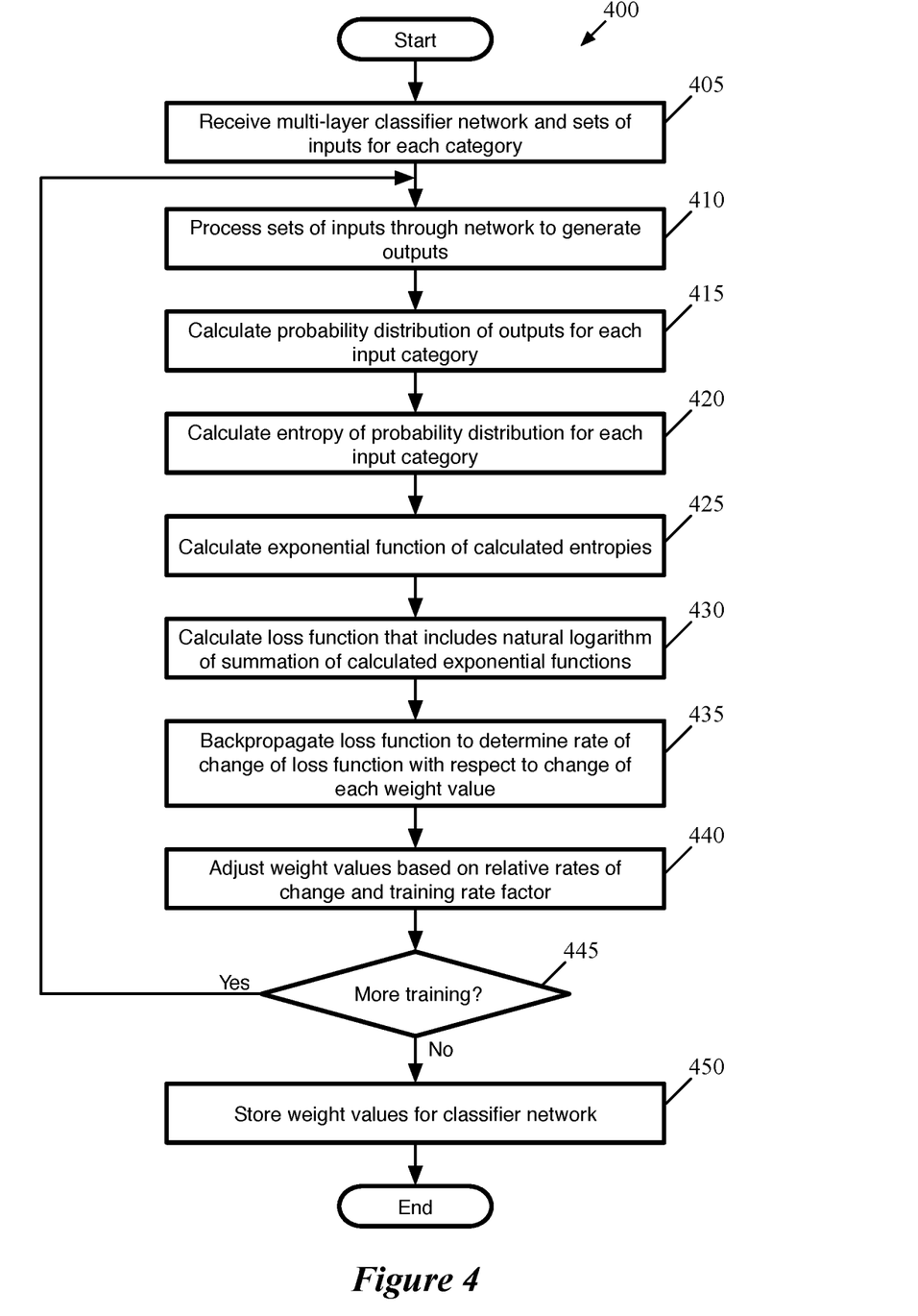
FIG. 4 conceptually illustrates a training process of some embodiments performed by the training system of FIG. 3 (or a similar system).

FIG. 4 conceptually illustrates a training process 400 of some embodiments performed by the training system 300 (or a similar system). The process 400 specifically pertains to training a classifier network (i.e., a network that classifies each input into one of a discrete set of categories. An example of such a classifier network is an object recognition network that takes an image as its input and classifies the image based on an object in the image (e.g., cat, dog, person, car, truck, etc.).

As shown, the process 400 begins by receiving (at 405) a multi-layer network (e.g., the network 330) with initial weight values, and inputs for each category. The set of inputs used to train a classifier network of some embodiments includes numerous (e.g., thousands) of inputs for each category, and the expected output probability distribution for the set of inputs of any given category is 100% for the particular category and 0% for each of the other categories (e.g., optimally the network should perfectly identify that a cat is a cat with no possibility that the cat is anything else). However, the typical output average probability distribution for a set of inputs of one category will be non-zero (though ideally close to 1 for the input category and close to 0 for the other categories).

The network 330 of some embodiments is a multi-layer machine-trained network (e.g., a feed-forward neural network), such as that shown in FIG. 2. It includes multiple layers of nodes, including a layer of input nodes, at least one layer of hidden nodes, and a layer of output nodes. Each hidden node and output node includes a linear component (that uses the weight values 335) and a non-linear activation function. The network 330 receives sets of inputs (in the case of a classifier network, a set of inputs for each category) and generates a corresponding output probability distribution(s). It should be noted that while the process 400 relates to a classifier network, similar processes may be adapted to other types of neural networks, and that the training system 300 of some embodiments is for training other types of networks in addition to classifier networks.

The weight values 335 are used to parametrize the network, and are trained by the system 300 for the network to perform a particular task. In some embodiments, these weights are initialized using a probabilistic distribution for each layer. That is, in some embodiments, the weights within each layer are selected randomly from a Gaussian distribution.

For the inputs, some embodiments perform training with a large number of different inputs, as this can help train the weight values for an average input. Each input in an input set may be an image, a voice snippet, etc. that is to be propagated through the network, depending on the specific purpose for which the network is being trained. For example, if a network is being trained to identify whether an image includes a face or not, the set of inputs will include numerous images, some of which have faces and some of which do not, probably including various types of edge cases (e.g., images where the face is distorted, where objects partially appear in front of the face, etc.). As mentioned, for the classifier network of some embodiments, the set of inputs includes numerous inputs for each output category.

The input generator 305 selects a set of inputs (and corresponding outputs) from the sets of inputs and outputs 340. In addition, in some embodiments, the input generator 305 breaks up the inputs into constituent values to be fed into the input layer of the network 330. For instance, for a network being trained for face recognition, the input generator might simply divide the pixels into several sections, or might perform computations based on the pixel values and feed these to the input layer (e.g., the percentage of red pixels in the image, the average red value of each pixel, or other statistics). That is, based on the input (e.g., an image), the input generator 305 might perform a set of computations in order to generate the inputs for the input layer of the network 330.

Next, the network 330 processes (at 410) the set of inputs through the network to generate outputs according to the state of the network 330 (and weight values 335). Each input propagates through the processing nodes of the network 330, with each layer of nodes receiving their one or more inputs and generating an output to pass to the next layer of nodes. In the final output layer, one or more nodes receives the outputs from the previous layer and generates the outputs of the network. In some embodiments, for each node, the linear component first computes a weighted sum of its input values (according to the current weight values 335) and then the non-linear activation function computes an output based on this weighted sum.

The error calculator 310 then computes the error for the input set (i.e., the loss function). As mentioned, rather than use a standard entropy function, some embodiments use an LSE approximation of an extremum function (also referred to as an extropy function). An example of such a (maximum) extropy function $\hat{E}(U)$ is the following:

$$\hat{E}(U) \equiv \frac{1}{\max Coeff} \ln\left(\sum_{u \in U} e^{\max Coeff * -lg(p_U(u))}\right) \quad \text{(G)}$$

In this equation, $p_u$ is the probability of u in probability distribution U, maxCoeff is a user-specified constant that controls the stiffness of the maximum, and lg is the base-2 logarithm. A larger maxCoeff value causes the function $\hat{E}(U)$ to approximate the maximum more closely.

Analogously, some embodiments express the minimum extropy function $\check{E}(U)$ as the following:

$$\check{E} \equiv \frac{-1}{\text{minCoeff}} \ln\left(\sum_{u \in U} e^{-\text{minCoeff}*-lg(p_U(u))}\right) \quad \text{(H)}$$

Here, minCoeff is also a user-specified constant that controls the stiffness of the minimum (playing the same role for the function $\check{E}(U)$ that the maxCoeff parameter plays for the function $\hat{E}(U)$. In both equations (G) and (H), the minus sign (-) is attached to the $lg(p_u(u))$ to indicate that this is the argument of the LSE function.

Relevant to a loss function for a network that processes inputs with known optimal outputs, some embodiments use a conditional maximum extropy function $\hat{E}(U|V)$:

$$\hat{E}(U \mid V) \equiv \frac{1}{\text{maxCoeff}} \ln\left(\sum_{v \in V} e^{\text{maxCoeff}*\Sigma_{u \in U} p_U(u|v)*-lg(p_u(u|v))}\right) \quad \text{(I)}$$

The minimum version of this conditional extropy function $\check{E}(U|V)$ is:

$$\check{E}(U \mid V) \equiv \frac{-1}{\text{minCoeff}} \ln\left(\sum_{v \in V} e^{-\text{minCoeff}*\Sigma_{u \in U} p_U(u|v)*-lg(p_U(u|v))}\right) \quad \text{(J)}$$

Here, the outer sum (of the LSE function) is over a set of conditions V (e.g., different input categories), with the argument of the exponent being an entropy calculation over the set of probability distributions U given each condition V. For the specific example of a classifier, the index of the summation is the set of input categories, and the argument of the exponential function is the entropy of the output probability distribution for the category. This loss function thus approximates the maximum of the entropies of the output probability distribution for the different input categories.

Returning to FIG. 4, the process 400 calculates (at 415) the probability distribution of the outputs for each input category (this is $p_u(u|v)$ in equation (I)). In some embodiments, this is an average probability distribution for each category over the inputs for that category. Next, the process calculates (at 420) the entropy of the probability distribution for each input category (i.e., $p_u(u|v)*-lg(p_u(u|v))$), using the probability distributions calculated at 415.

Continuing with the loss function calculation, the process 400 calculates (at 425) the exponential function of each of the calculated entropies (i.e., ex, where x represents the entropies calculated at 420) and then calculates (at 430) the loss function that includes the natural logarithm of the summation of these calculated exponential functions.

The process 400 thus describes a loss function calculation that uses the formulation of equation (I); however, it should be noted that some embodiments improve on this by also using the LSE formulation for the inner entropy calculation. Using equation (I) in the classifier situation highlights the input category with the worst-case error, but within that category (or other categories that are low-error on average) the actual worst-case inputs may not be picked up on. Thus, some embodiments use the following formulation that uses the LSE approach for both the inner and outer entropy calculations:

$$\hat{E}(U \mid V) \equiv \frac{1}{\text{maxCoeff}} \ln\left(\sum_{v \in V} e^{\frac{\text{maxCoeff}}{-\text{minCoeff}}*\ln \Sigma_{u \in U} e^{-\text{minCoeff}*-lg(p_U(u|v))}}\right) \quad \text{(K)}$$

and $$\check{E}(U \mid V) \equiv \frac{-1}{\text{minCoeff}} \ln\left(\sum_{v \in V} e^{\frac{-\text{minCoeff}}{\text{maxCoeff}}*\ln \Sigma_{u \in U} e^{\text{maxCoeff}*-lg(p_U(u|v))}}\right). \quad \text{(L)}$$

One issue with either the formulation of equations (I) and (J) or that of equations (K) and (L) is that sums of exponentials may be problematic for computers to evaluate accurately because the dynamic range of the values being summed may be large. In the context of these extropy calculations, the primary interest is either the approximately largest or approximately smallest values in the sum. This enables a log-sum-exp trick used by some embodiments to preserve the numerical accuracy of these terms. The log-sum-exp trick states that:

$$\text{LSE}(x_1, \ldots, x_n) = x^* + \ln(e^{x_1 - x^*} + \cdots + e^{x_n - x^*}), \quad \text{(M)}$$

with $x^* = \max(x_1, \ldots x_n)$ As an illustration of this principle, equation (G) can be replaced with its equivalent:

$$\hat{E}(U) \equiv \text{maxLog}_U + \frac{1}{\text{maxCoeff}} \ln\left(\sum_{u \in U} e^{\text{maxCoeff}*(-lg(p_U(u)) - \text{maxLog}_U)}\right), \quad \text{(N)}$$

where $$\text{maxLog}_U = \max_{u \in U}(-lg(p_U(u))).$$

Subtracting the maximum $-lg(p_u(u))$ in the exponent makes the exponentiation operation return 1 for the maximal $p_u(u)$ and $e^{-\text{maxCoeff}*delta(u)}$ for the other u, where delta(u) is the (positive) difference between the maxLog$_u$ and $-lg(p_u(u))$. Adding back in the maxLog$_u$ undoes the mathematical modification of the exponent while preserving numerical accuracy. This trick can similarly be applied in the minimum extropy computation of equation (E) as:

$$\check{E}(U) = \text{minLog}_U - \frac{1}{\text{minCoeff}} \ln\left(\sum_{u \in U} e^{-\text{minCoeff}*(-lg(p_U(u)) - \text{minLog}_U)}\right), \quad \text{(O)}$$

where $$\text{minLog}_U = \min_{u \in U}(-lg(p_U(u))).$$

In addition, some embodiments apply this idea twice to make the computation of conditional extropy more numerically stable. In this case, the trick is applied both for the inner extropy computation and for the outer extropy computation. Thus, it should be understood that the process 400 of FIG. 4 is a conceptual process, and that the operations 415-430 may be performed differently, such as by using the log-sum-exp trick.

With the loss function calculated, the process 400 (e.g., the error propagator 315) backpropagates (at 435) the loss function to determine the rate of change of the loss function with respect to a change of each weight value. In typical training, the loss function is backpropagated through the network in a process that determines, for each weight, the rate of change of the loss function with respect to a change in the weight at the current value of the loss function. The backpropagation process uses the chain rule for partial derivatives to isolate the partial derivative of the loss function with respect to each individual weight used in the multi-layer network, and assign a value to this partial derivative for the current value of the loss function. Thus, this process identifies the relative effect on the loss function of changes to the many different weights used to generate the outputs of the network.

Specifically, if L is the combined loss function, then the backpropagation computes, for each weight $w_{ik}$, the partial derivative $$\frac{\partial L}{\partial w_{ik}}.$$

Because the weights are isolated in a node's output computation, computing these partial derivatives is not difficult via application of the chain rule. In this sense, the loss function is a function in many-dimensional space (i.e., with the various weight coefficient values being the many dimensions), and the nature of the function means that the effect of each weight value can be easily isolated for a given loss function value.

Returning to the process 400, the weight modifier 325 adjusts (at 440) the weight values based on the relative rates of change and a training rate factor. That is, the error propagator 315 provides, for each weight value $w_{ik}$, the partial derivative of the loss function with respect to that $w_{ik}$. These partial derivatives are used to update the weight values by moving the weight values in the direction opposite the gradient (to attempt to reduce the loss function value) by a particular amount, with a larger partial derivative for a particular weight (i.e., a component of the gradient) resulting in a greater change to that weight. The weight modifier 325 uses a training rate factor from the training parameters 350 to determine how much to change the weight values based on the instantaneous gradient components. That is, the gradient component for a particular weight provides an amount to move (in the direction opposite to the gradient component, as the goal is to minimize the loss function) that weight value relative to the other weight values, while the training rate specifies the distance of that move. Specifically, for each weight value $w_{ik}$, with a learning rate r, the weight modifier updates this weight value using the following equation.

$$w_{ik(updated)} = w_{ik} - \left(r * \frac{\partial L}{\partial w_{ik}}\right) \quad (P)$$

By using a loss function that emphasizes the worst-case error, the backpropagation updates the weights so as to attempt to correct this error rather than the average error. As the partial gradients are greater for the weight values that affect the loss function the most, these weight values whose change will have the greatest effect on minimizing the worst-case error will be adjusted the most.

After updating the weights, the process 400 determines (at 445) whether to perform more training. Some embodiments use a minimization process (e.g., a stochastic gradient descent minimizer) to determine when to stop training the network. In some embodiments, the system 300 only stops training the network once all of the weights have changed by less than a threshold for a particular number of training iterations. In some embodiments, the input generator determines whether to perform more training; in other embodiments, a different module (e.g., a module not shown in FIG. 3 makes this determination).

If more training is required, the process 400 returns to 410 to process a set of inputs (e.g., the same set of inputs or a different set of inputs). Once the system 300 determines that no more training is required, the process 400 of some embodiments stores (at 450) the current weight values for the classifier network. This network can then be embedded in a device so as to perform the desired classification process for new inputs.

Figure 5:
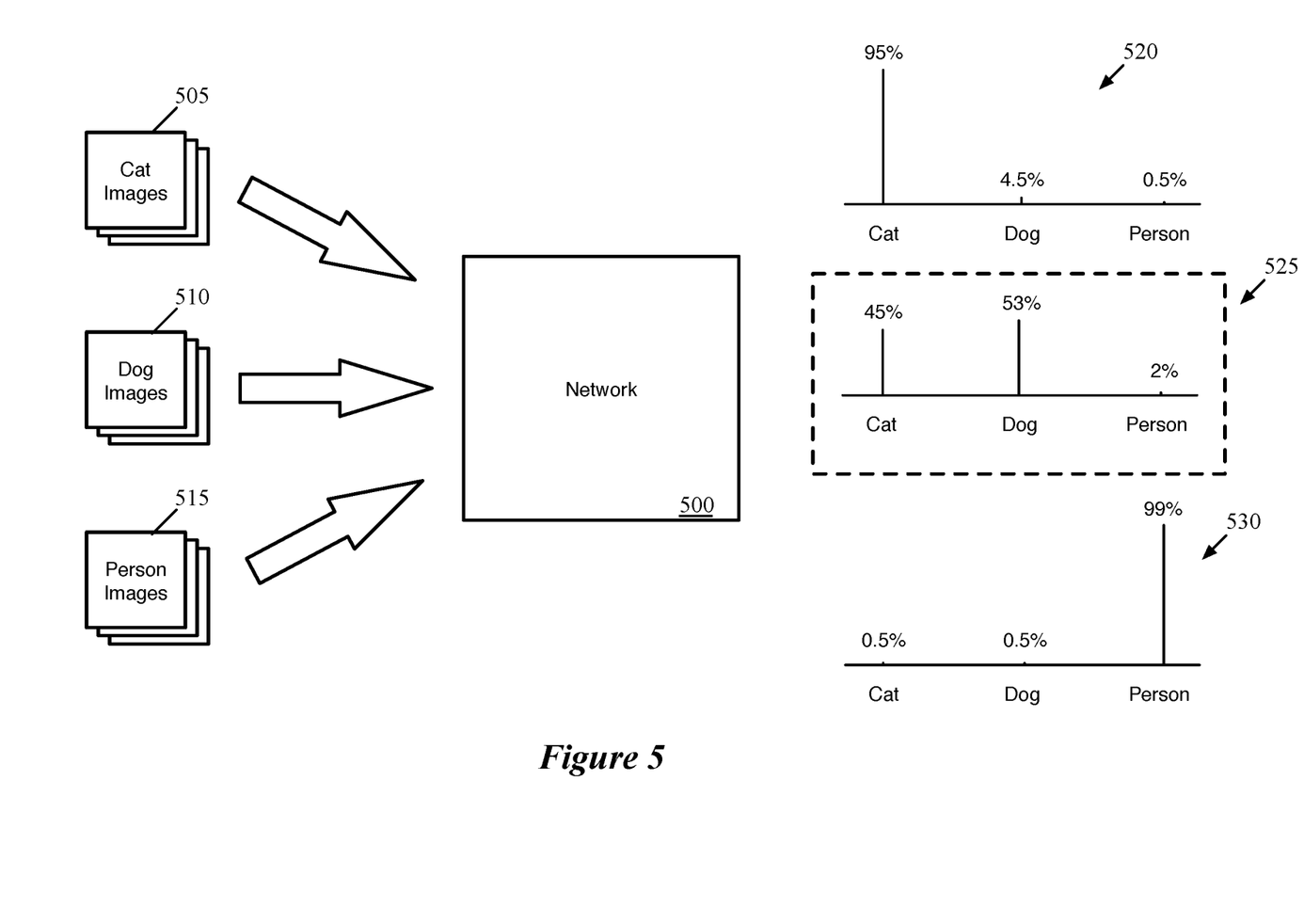
FIG. 5 illustrates an example of a classifier network 500 during training.

FIG. 5 illustrates an example of a classifier network 500 during training. The classifier network determines whether an input image shows a cat, a dog, or a person. In some embodiments, though not shown here, such a network 500 would also include a none of the above output option, as well as combination outputs (e.g., for images that include both a cat and a dog, a cat and a person, all three, etc.). For the sake of simplicity, however, the network 500 has three possible outputs, and identifies one of the categories for each input image.

In this example, three sets of inputs 505-515 are provided to the network 500. These sets of inputs are images of cats 505, images of dogs 510, and images of people 515. The network attempts to classify these groups, and this results in three output probability distributions 520-530. As shown, the cat images 505 have a probability distribution 520 of 95% cat, 4.5% dog, and 0.5% person. This probability distribution 520, in some embodiments, represents the average probability distribution output by the network 500 in the condition that the input image is one of the cat images 505. The dog images have a resulting probability distribution 525 of 45% cat, 53% dog, and 2% person. Lastly, the person images 515 have a resulting probability distribution 515 of 0.5% cat, 0.5% dog, and 99% person.

For the calculation of the loss function in this example, equation (I) will be used, with a maxCoeff value of 1. The entropy calculation for each of the three probability distributions (using c, d, and p for cat inputs, dog inputs, and person inputs) is approximately:

$$\sum_{u \in U} p_U(u|c) * -lg(p_U(u|c)) = (0.95 * 0.074) + (0.045 * 4.474) + (0.005 * 7.644) = 0.31$$

$$\sum_{u \in U} p_U(u|d) * -lg(p_U(u|d)) =$$
$$(0.45 * 1.152) + (0.53 * 0.916) + (0.02 * 5.644) = 1.117$$

$$\sum_{u \in U} p_U(u|p) * -lg(p_U(u|c)) =$$
$$(0.005 * 7.644) + (0.005 * 7.644) + (0.99 * 0.014) = 0.09$$

As is apparent, the second probability distribution 525 (for dog images) has a much larger entropy than the other two probability distributions 520 and 530, because it is much further from the optimal output probability distribution than the other two distributions. Computing the loss function is as follows:

$$\ln \sum_{v \in V} e^{\Sigma_{u \in U} p_U(u|v) * -lg(p_U(u|v))} = \ln(e^{0.31} + e^{1.117} + e^{0.09}) = \ln 5.513 = 1.707$$

Because there are only three different conditions in this example, the maxCoeff value is only 1 rather than a larger value, and the first probability distribution is not that close to optimal (with only 95% success), the loss function calculates to a greater value than the max entropy value of 1.117. However, the loss function does still emphasize the probability distribution 525 for dog image inputs, and during backpropagation the weights that have the greatest effect on this probability distribution will be modified the most.

Instead of or in addition to using an entropy or extropy term within the loss function, some embodiments use a mutual information (MI) term. The mutual information between two discrete random variables, U and V, is defined as:

$$I(U;V) \equiv \sum_{u \in U, v \in V} p_{U \times V}(u,v) lg \frac{p(u,v)}{p(u)p(v)}. \tag{Q}$$

In a similar spirit as entropy, MI computes the expected number of bits that one learns about V by knowing U (and vice-versa), and has been expressed as:

$$I(U;V)=H(U)-H(U|V)=H(V)-H(V|U). \tag{R}$$

However, in many applications, the best- or worst-case number of bits provided by one random variable about another is more interesting. For example, in the context of rate-distortion theory or channel capacity, one is as likely to care about worst-case (i.e., guaranteed) performance as about average performance. However, existing MI costing techniques provide no such worst-case guarantee, except asymptotically.

To address shortcomings of existing MI costing techniques, some embodiments compute maximum MI function and minimal MI function as follows:

$$\hat{I}(U;V) \equiv \hat{E}(U) - \check{E}(U|V) = \hat{E}(V) - \check{E}(V|U), \text{ and} \tag{S}$$

$$\check{I}(U;V) \equiv \check{E}(U) - \hat{E}(U|V) = \check{E}(V) - \hat{E}(V|U) \tag{T}$$

These maximum and minimum functions are referred to herein as Mutual Extremal Information or MEI. One example of a use for these functions in training a network is to minimize mutual information from the input to a selected intermediate layer in the network and to maximize mutual information from that selected layer to the output.

In addition, an Information Bottleneck (IB) is usually defined as IB(X,Y)≡I(X;X')-β*I(X';Y). In typical applications of the Information Bottleneck method, the goal is to minimize the IB function. Using the definitions of mutual extremal information above, the extropic version of IB becomes the Extremal Information Bottleneck or EIB, defined as follows:

$$EIB(X,Y) \equiv \hat{E}(X') - \check{E}(X'|X) - \beta*(\check{E}(X') - \hat{E}(X'|Y)). \tag{U}$$

The IB variant of some embodiments minimizes $$\widetilde{IB}(X,Y) \equiv I(X;X') - \beta*I(S';Y). \tag{V}$$

As such, the incorporation of extropy leads to the following:

$$\widetilde{EIB}(X,Y) \equiv \hat{E}(X') - \check{E}(X'|X) - \beta*(\check{E}(S') - \hat{E}(S'|Y)). \tag{W}$$

Figure 6:
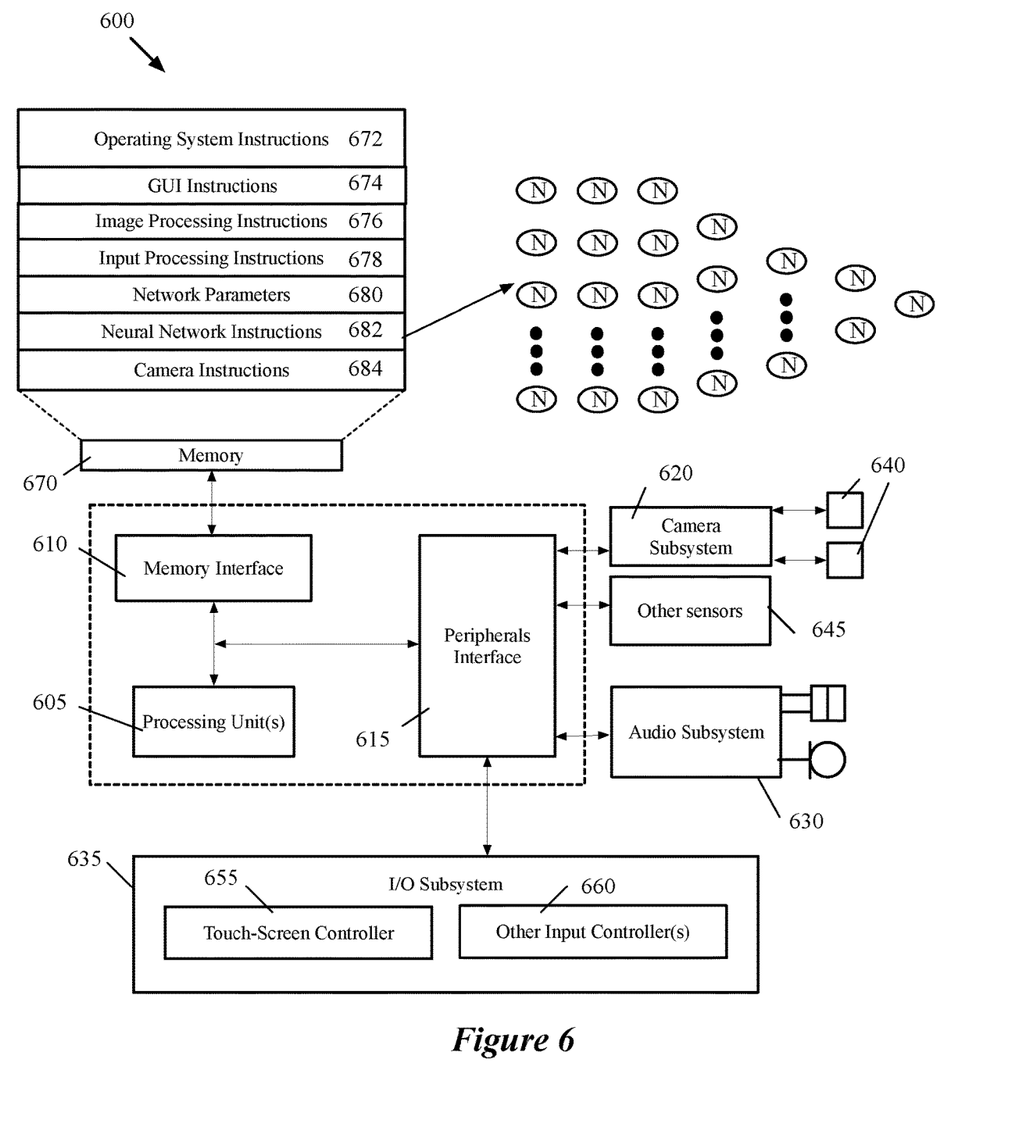
FIG. 6 illustrates an example of an architecture of a mobile computing device that stores neural network processing instructions.

FIG. 6 is an example of an architecture 600 of a mobile computing device that stores neural network processing instructions, with at least one set of weight parameters for the network. Examples of mobile computing devices include smartphones, tablets, laptops, etc. As shown, the mobile computing device 600 includes one or more processing units 605, a memory interface 610 and a peripherals interface 615. While a mobile device is shown in this example, many of these principles apply to other types of devices that use neural networks. An IOT device, for instance, might have fewer subsystems and fewer types of stored instructions, to perform its specific purpose and have the ability to receive a single type of input that is evaluated with its neural network.

The peripherals interface 615 is coupled to various sensors and subsystems, including a camera subsystem 620, an audio subsystem 630, an I/O subsystem 635, and other sensors 645 (e.g., motion sensors), etc. The peripherals interface 615 enables communication between the processing units 605 and various peripherals. For example, an orientation sensor (e.g., a gyroscope) and an acceleration sensor (e.g., an accelerometer) can be coupled to the peripherals interface 615 to facilitate orientation and acceleration functions. The camera subsystem 620 is coupled to one or more optical sensors 640 (e.g., a charged coupled device (CCD) optical sensor, a complementary metal-oxide-semiconductor (CMOS) optical sensor, etc.). The camera subsystem 620 and the optical sensors 640 facilitate camera functions, such as image and/or video data capturing.

The audio subsystem 630 couples with a speaker to output audio (e.g., to output voice navigation instructions). Additionally, the audio subsystem 630 is coupled to a microphone to facilitate voice-enabled functions, such as voice recognition (e.g., for searching), digital recording, etc. The I/O subsystem 635 involves the transfer between input/output peripheral devices, such as a display, a touch screen, etc., and the data bus of the processing units 605 through the peripherals interface 615. The I/O subsystem 635 includes a touch-screen controller 655 and other input controllers 660 to facilitate the transfer between input/output peripheral devices and the data bus of the processing units 605. The touch-screen controller couples with a touch screen (not shown) to detect contact and movement on the touch screen using any of multiple touch sensitivity technologies. The other input controllers 660 are coupled to other input/control devices, such as one or more buttons.

In some embodiments, the device includes wireless communication subsystem (not shown in FIG. 6) to establish wireless communication functions. In some embodiments, the wireless communication subsystem includes radio frequency receivers and transmitters, and/or optical receivers and transmitters. These receivers and transmitters of some embodiments are implemented to operate over one or more communication networks such as a GSM network, a Wi-Fi network, a Bluetooth network, etc.

The memory interface 610 is coupled to memory 670. As illustrated in FIG. 6, the memory 670 stores an operating system (OS) 672. The OS 672 includes instructions for handling basic system services and for performing hardware dependent tasks. The memory 670 also stores various sets of instructions, including (1) graphical user interface instructions 674 to facilitate graphic user interface processing; (2) image processing instructions 676 to facilitate image-related processing and functions; (3) input processing instructions 678 to facilitate input-related (e.g., touch input) processes and functions; and (4) camera instructions 684 to facilitate camera-related processes and functions. The processing units 610 execute the instructions stored in the memory 670 in some embodiments.

In addition, the memory 670 stores generic neural network instructions 682, for implementing a machine-trained network of some embodiments of the invention. The memory also stores at least one set of network parameters 680 (i.e., weight values for enabling the network to perform a specific purpose). These network parameters 680 may include multiple sets of weight values in some embodiments (e.g., a set of weight values for an audio-processing network and a set of weight values for an image-processing network). These sets of weights are used by the processing units 610 when executing the neural network instructions 682 to perform a specific purpose (e.g., audio processing, image processing, etc.).

The memory 670 further stores communication instructions to facilitate communicating with one or more additional devices. The instructions described above are merely exemplary and the memory 670 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

The memory 670 may represent multiple different storages available on the device 600. In some embodiments, the memory 670 includes volatile memory (e.g., high-speed random access memory), non-volatile memory (e.g., flash memory), a combination of volatile and non-volatile memory, and/or any other type of memory. In some embodiments, the memory 670 includes processor registers, multiple levels of processor caches (e.g., the L0 micro-operations cache, L1 instruction cache, L1 data cache, etc.), main memory (e.g., RAM), disk storage, etc. In some embodiments, when possible, one or more sets of weight parameters 680 are stored in one of the levels of processor caches, so that the data is quickly accessible and does not need to be loaded onto the processor to evaluate an input.

While the components illustrated in FIG. 6 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 6 may be split into two or more integrated circuits.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
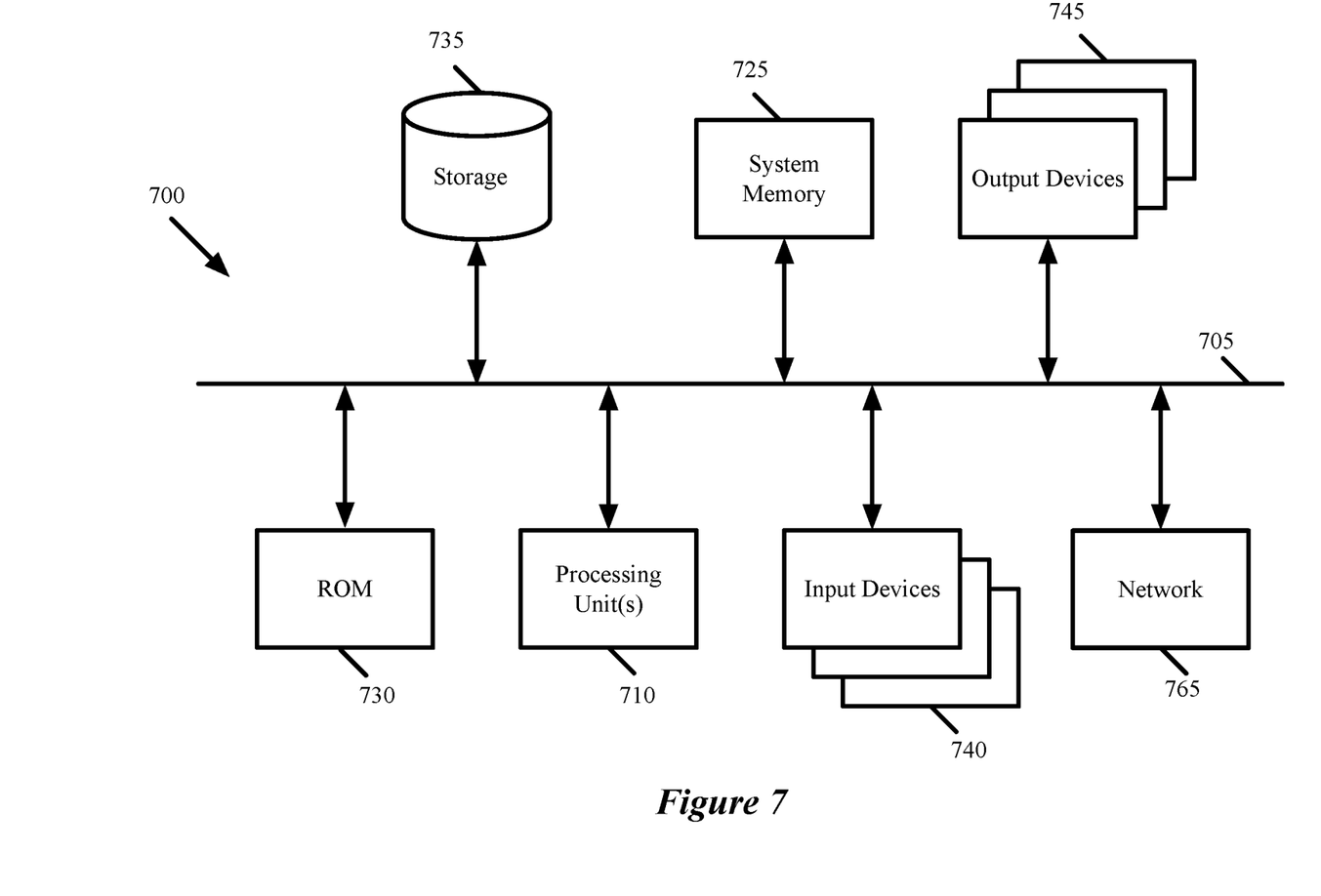
FIG. 7 conceptually illustrates an electronic system with which some embodiments of the invention are implemented.

FIG. 7 conceptually illustrates an electronic system 700 with which some embodiments of the invention are implemented. The electronic system 700 can be used to execute any of the control, virtualization, or operating system applications described above. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieves instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieves instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1 and 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for configuring a machine-trained (MT) network that receives inputs and, for each input, categorizes the input into one of a set of discrete categories, the MT network comprising a plurality of configurable weights to train, the method comprising:

propagating a set of inputs through the MT network to generate a set of output probability distributions, the generated output probability distribution for each input providing a probability of the input being categorized into each of the discrete categories by the MT network, each input having a corresponding expected output probability distribution that indicates the input belongs to a particular category;

calculating a value of a continuously-differentiable loss function comprising a term that uses a natural logarithm of a summation of a plurality of exponential functions to approximate an extremum function of the difference between the expected output probability distributions and generated set of output probability distributions, wherein (i) the index of the summation is the set of discrete categories and (ii) the exponent of the exponential function for each category is a function of generated output probability distributions for inputs belonging to the category; and training the weights by back-propagating the calculated value of the continuously-differentiable loss function, wherein the term that approximates the extremum function biases the training of the weights towards reducing a difference between the expected output probability distributions and the generated output probability distributions for inputs belonging to a category with a greatest difference.

2. The method of claim 1, wherein:

the term that uses a natural logarithm of a summation of a plurality of exponential functions approximates a maximum function; and training the weights comprises minimizing the approximation of the maximum function.

3. The method of claim 1, wherein:

the term that uses a natural logarithm of a summation of a plurality of exponential functions approximates a minimum function; and training the weights comprises maximizing the approximation of the minimum function.

4. The method of claim 1, wherein:

the set of inputs comprises a plurality of inputs for each of the categories; and for each category of input, the expected output probability distribution for each input is a same expected output probability distribution.

5. The method of claim 4, wherein the expected output probability distribution for each input is 1 for the category to which the input belongs and 0 for each other category.

6. The method of claim 1, wherein, for each category, the function of the generated output probability distributions for inputs belonging to the category is an entropy calculation for the generated output probability distributions for inputs belonging to the category.

7. The method of claim 6, wherein the entropy calculation for the generated output probability distributions for inputs belonging to a particular category comprises a sum over each discrete probability in the generated output probability distributions multiplied by the negative of the base-2 logarithm of the discrete probability.

8. The method of claim 6, wherein the term that uses a natural logarithm of a summation of a plurality of exponential functions to approximate the extremum function biases the training of the weights towards weight values that minimize the maximum of the entropy calculations for the discrete categories.

9. The method of claim 1, wherein the MT network comprises input nodes, output nodes, and interior nodes between the input and output nodes, wherein each node produces an output value and each interior node and output node receives as input values a set of output values of input nodes or other interior nodes and applies a set of the configurable weights to each received input value.

10. The method of claim 1 further comprising performing the propagating, calculating, and back-propagating iteratively.

11. The method of claim 1, wherein training the weights comprises:
  back-propagating the calculated value through the MT network to determine, for each weight, a rate of change in the calculated value relative to a rate of change in the weight; and
  modifying each particular weight according to the determined rate of change for the particular weight.

12. The method of claim 1, wherein the MT network is for embedding into a device after training is complete.

13. The method of claim 1, wherein propagating the set of inputs through the MT network comprises calculating an output value for each interior node and output node, wherein calculating the output value for a particular interior node comprises:
  receiving a set of input values from a set of other interior nodes;
  calculating a linear summation of each input value multiplied by a corresponding weight value; and
  applying a non-linear function to the summation to calculate the output value for the particular node.

14. The method of claim 10, wherein the propagating, calculating, and back-propagating are performed iteratively until each of the weights have been changed by less than a particular threshold for a particular number of iterations.

15. The method of claim 1, wherein the inputs are input images and the MT network categorizes each input based on an object shown in the image.

16. A non-transitory machine-readable medium storing a program which when executed by at least one processing unit configures a machine-trained (MT) network that receives inputs and, for each input, categorizes the input into one of a set of discrete categories, the MT network comprising a plurality of configurable weights to train, the program comprising sets of instructions for:
  propagating a set of inputs through the MT network to generate a set of output probability distributions, the generated output probability distribution for each input providing a probability of the input being categorized into each of the discrete categories by the MT network, each input having a corresponding expected output probability distribution that indicates the input belongs to a particular category;
  calculating a value of a continuously-differentiable loss function comprising a term that uses a natural logarithm of a summation of a plurality of exponential functions to approximate an extremum function of the difference between the expected output probability distributions and generated set of output probability distributions, wherein (i) the index of the summation is the set of discrete categories and (ii) the exponent of the exponential function for each category is a function of generated output probability distributions for inputs belonging to the category; and
  training the weights by back-propagating the calculated value of the continuously-differentiable loss function, wherein the term that approximates the extremum function biases the training of the weights towards reducing a difference between the expected output probability distributions and the generated output probability distributions for inputs belonging to a category with a greatest difference.

17. The non-transitory machine-readable medium of claim 16, wherein:
  the set of inputs comprises a plurality of inputs for each of the categories; and
  for each category of input, the expected output probability distribution for each input is a same expected output probability distribution.

18. The non-transitory machine-readable medium of claim 17, wherein the expected output probability distribution for each input is 1 for the category to which the input belongs and 0 for each other category.

19. The non-transitory machine-readable medium of claim 16, wherein, for each category, the function of the generated output probability distributions for inputs belonging to the category is an entropy calculation for the generated output probability distributions for inputs belonging to the category.

20. The non-transitory machine-readable medium of claim 19, wherein the entropy calculation for the generated output probability distributions for inputs belonging to a particular category comprises a sum over each discrete probability in the generated output probability distributions multiplied by the negative of the base-2 logarithm of the discrete probability.

21. The non-transitory machine-readable medium of claim 19, wherein the term that uses a natural logarithm of a summation of a plurality of exponential functions to approximate the extremum function biases the training of the weights towards weight values that minimize the maximum of the entropy calculations for the discrete categories.

22. The non-transitory machine-readable medium of claim 16, wherein the inputs are input images and the MT network categorizes each input based on an object shown in the image.

* * * * *